(12) United States Patent
Schmitz et al.

(10) Patent No.: US 8,702,037 B2
(45) Date of Patent: Apr. 22, 2014

(54) TRANSLATING STOWAGE BIN AND METHOD OF ASSEMBLY

(75) Inventors: Chad D. Schmitz, Arlington, WA (US); Aaron Justus Pederson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/246,954

(22) Filed: Sep. 28, 2011

(65) Prior Publication Data

US 2013/0076216 A1    Mar. 28, 2013

(51) Int. Cl.
*B64D 11/00* (2006.01)

(52) U.S. Cl.
USPC .................................................... 244/118.5

(58) Field of Classification Search
USPC ......... 244/118.5, 118.6, 118.1; 312/109, 110, 312/331, 323
See application file for complete search history.

(56) References Cited

U.S. PATENT DOCUMENTS

| | | | | |
|---|---|---|---|---|
| 443,350 | A | * | 12/1890 | Berners .............................. 49/197 |
| 644,434 | A | * | 2/1900 | Macey ............................ 312/110 |
| 4,375,907 | A | * | 3/1983 | Vander Kooi et al. ......... 312/109 |
| 5,244,269 | A | | 9/1993 | Harriehausen et al. |
| 5,383,628 | A | * | 1/1995 | Harriehausen et al. .... 244/118.1 |
| 5,826,936 | A | | 10/1998 | Scordato et al. |
| 6,484,969 | B2 | * | 11/2002 | Sprenger et al. ............ 244/118.5 |
| 6,662,405 | B2 | | 12/2003 | Vitry |
| 6,886,781 | B2 | * | 5/2005 | Lau et al. .................... 244/118.1 |
| 7,185,927 | B2 | | 3/2007 | Talukdar et al. |
| 2006/0132007 | A1 | * | 6/2006 | Beckley ........................ 312/325 |
| 2007/0102587 | A1 | | 5/2007 | Jones et al. |

FOREIGN PATENT DOCUMENTS

| | | |
|---|---|---|
| DE | 199 46 629 | 4/2001 |
| DE | 10 2009 051 363 A1 | 5/2011 |
| WO | WO2010040776 * | 4/2010 |

OTHER PUBLICATIONS

Sclater, N., et al; Mechanisms and Mechanical Devices Sourcebook; Fourth Edition; ©2007 The McGraw-Hill Companies; ISBN-13: 978-0071467612; 553 pages.
Hiscox, G.; 1800 Mechanical Movements, Devices and Appliances; Unabridged Republication of the 1921 sixteenth edition; Dover Publications, Mineola, NY; ISBN 0-486-45743-5; pp. 1-30.
Hiscox, G.; 1800 Mechanical Movements, Devices and Appliances; Unabridged Republication of the 1921 sixteenth edition; Dover Publications, Mineola, NY; ISBN 0-486-45743-5; pp. 31-60.
Hiscox, G.; 1800 Mechanical Movements, Devices and Appliances; Unabridged Republication of the 1921 sixteenth edition; Dover Publications, Mineola, NY; ISBN 0-486-45743-5; pp. 61-90.
Hiscox, G.; 1800 Mechanical Movements, Devices and Appliances; Unabridged Republication of the 1921 sixteenth edition; Dover Publications, Mineola, NY; ISBN 0-486-45743-5; pp. 91-120.

(Continued)

*Primary Examiner* — Matthew Ing
(74) *Attorney, Agent, or Firm* — Armstrong Teasdale LLP

(57) ABSTRACT

A stowage bin is provided. The stowage bin includes a support assembly, a bucket including a pivot point, the bucket rotatable about the pivot point between a closed position and an open position, and a translating mechanism coupling the bucket to the support assembly such that when the bucket is rotated between the closed and open positions, the pivot point translates with respect to the support assembly between a first pivot position and a second pivot position.

18 Claims, 12 Drawing Sheets

(56) References Cited

OTHER PUBLICATIONS

Hiscox, G.; 1800 Mechanical Movements, Devices and Appliances; Unabridged Republication of the 1921 sixteenth edition; Dover Publications, Mineola, NY; ISBN 0-486-45743-5; pp. 121-150.

Hiscox, G.; 1800 Mechanical Movements, Devices and Appliances; Unabridged Republication of the 1921 sixteenth edition; Dover Publications, Mineola, NY; ISBN 0-486-45743-5; pp. 151-185.

Hiscox, G.; 1800 Mechanical Movements, Devices and Appliances; Unabridged Republication of the 1921 sixteenth edition; Dover Publications, Mineola, NY; ISBN 0-486-45743-5; pp. 186-220.

Hiscox, G.; 1800 Mechanical Movements, Devices and Appliances; Unabridged Republication of the 1921 sixteenth edition; Dover Publications, Mineola, NY; ISBN 0-486-45743-5; pp. 221-250.

Hiscox, G.; 1800 Mechanical Movements, Devices and Appliances; Unabridged Republication of the 1921 sixteenth edition; Dover Publications, Mineola, NY; ISBN 0-486-45743-5; pp. 251-280.

Hiscox, G.; 1800 Mechanical Movements, Devices and Appliances; Unabridged Republication of the 1921 sixteenth edition; Dover Publications, Mineola, NY; ISBN 0-486-45743-5; pp. 281-310.

Hiscox, G.; 1800 Mechanical Movements, Devices and Appliances; Unabridged Republication of the 1921 sixteenth edition; Dover Publications, Mineola, NY; ISBN 0-486-45743-5; pp. 311-340.

Hiscox, G.; 1800 Mechanical Movements, Devices and Appliances; Unabridged Republication of the 1921 sixteenth edition; Dover Publications, Mineola, NY; ISBN 0-486-45743-5; pp. 341-375.

Hiscox, G.; 1800 Mechanical Movements, Devices and Appliances; Unabridged Republication of the 1921 sixteenth edition; Dover Publications, Mineola, NY; ISBN 0-486-45743-5; pp. 376-400.

Hiscox, G.; 1800 Mechanical Movements, Devices and Appliances; Unabridged Republication of the 1921 sixteenth edition; Dover Publications, Mineola, NY; ISBN 0-486-45743-5; pp. 401-416.

Brown, H.; Five Hundred and Seven Mechanical Movements: Embracing All Those Which are Most Important in Dynamics, Hydraulics, Hydrostatics, Pneumatics, Steam Engines; 1871; Brown, Coombs & Co.; NY; 122 pages.

Schwarz, O. et al; Pictorial Handbook of Technical Devices; ©1971; Chemical Publishing Co., Inc.; NY; ISBN13-:978-0820602349; 605 pages.

Extended European Search Report of application No. EP 12186075.3; Dec. 12, 2012; 5 pages.

* cited by examiner

TRANSLATING STOWAGE BIN AND METHOD OF ASSEMBLY

BACKGROUND

The field of the disclosure relates generally to stowage bins, and, more particularly, to aircraft stowage bins and methods of assembling the same.

Vehicles, such as commercial aircraft, generally include stowage bins for storing the luggage of passengers and crew members. As demand for stowage space increases, increasingly larger stowage bins have been designed. Although larger stowage bins are capable of storing more luggage, at least some known larger stowage bins require an increased force to open or close the bins due to their increased size and thus may be difficult for passengers to use.

Further, in a closed position, to facilitate maximizing cabin space, it is desirable that a stowage bin be positioned as high within the cabin as possible. In contrast, in an open position, it is desirable that the stowage bin be positioned as low as possible to enable individuals to insert luggage into the bin and remove luggage from the bin.

BRIEF DESCRIPTION

In one aspect, a stowage bin is provided. The stowage bin includes a support assembly, a bucket including a pivot point, the bucket rotatable about the pivot point between a closed position and an open position, and a translating mechanism coupling the bucket to the support assembly such that when the bucket is rotated between the closed and open positions, the pivot point translates with respect to the support assembly between a first pivot position and a second pivot position.

In another aspect, an apparatus is provided. The apparatus includes a first object, a second object including a pivot point, the second object rotatable about the pivot point between a first position and a second position, and a translating mechanism coupling the second object to the first object such that when the second object is rotated between the first and second positions, the pivot point translates with respect to the first object between a first pivot position and a second pivot position.

In yet another aspect, a method of assembling a stowage bin is provided. The method includes providing a bucket including a pivot point, wherein the bucket is selectively rotatable about the pivot point between a closed position and an open position, and coupling the bucket to a support assembly via a translating mechanism such that when the bucket is rotated between the closed and open positions, the pivot point translates with respect to the support assembly between a first pivot position and a second pivot position.

DETAILED DESCRIPTION

The systems and methods described herein provide improvements over at least some known stowage bins. More specifically, the systems and methods described herein provide a stowage bin that includes a bucket and a support assembly. When the bucket is rotated about a pivot point between an open position and a closed position, the pivot point translates with respect to the support assembly. The translation of the pivot point facilitates increasing the accessibility of the bucket in the open position, while decreasing the force needed to close the stowage bin. Further, the stowage bin maintains a constant interference gap between the bucket and support assembly to prevent pinching objects between the bucket and support assembly during rotation.

Figure 1:
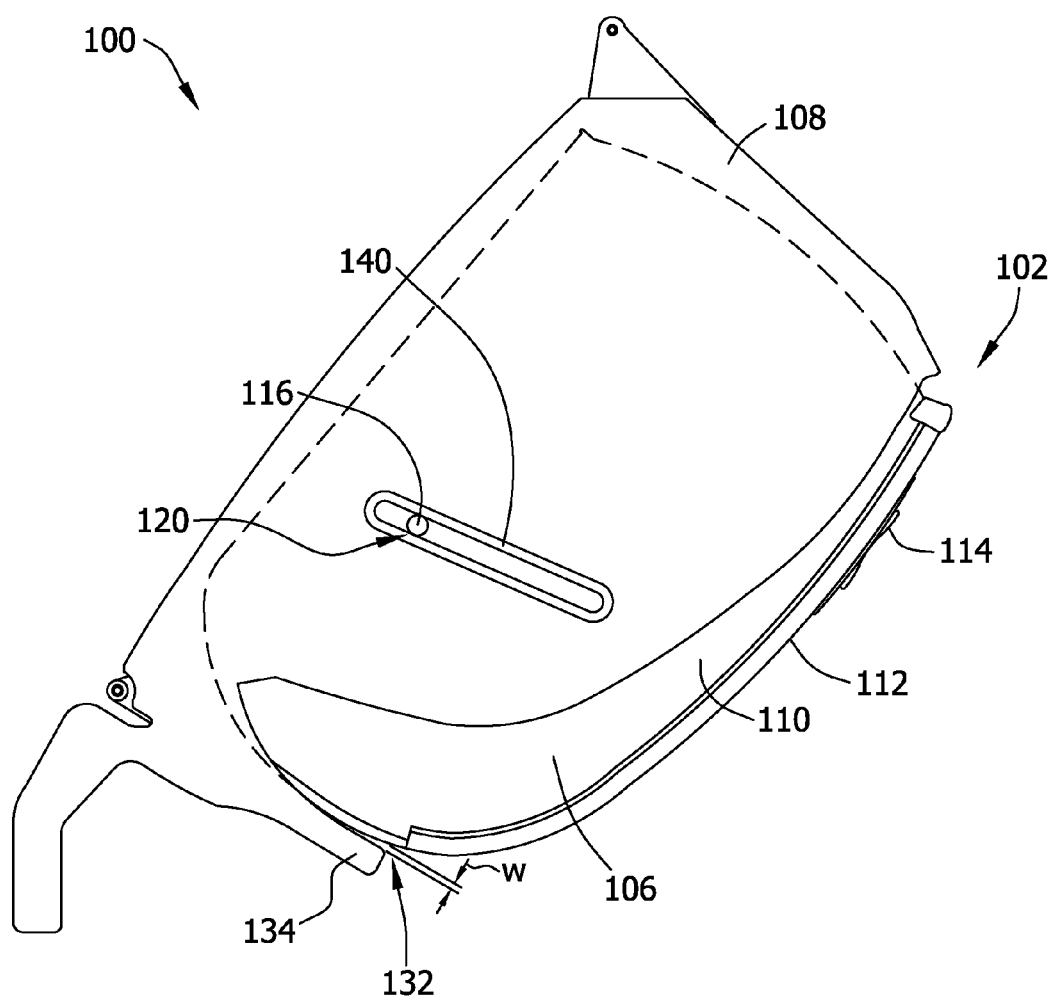
FIG. 1 is an exemplary stowage bin in a closed position.
Figure 2:
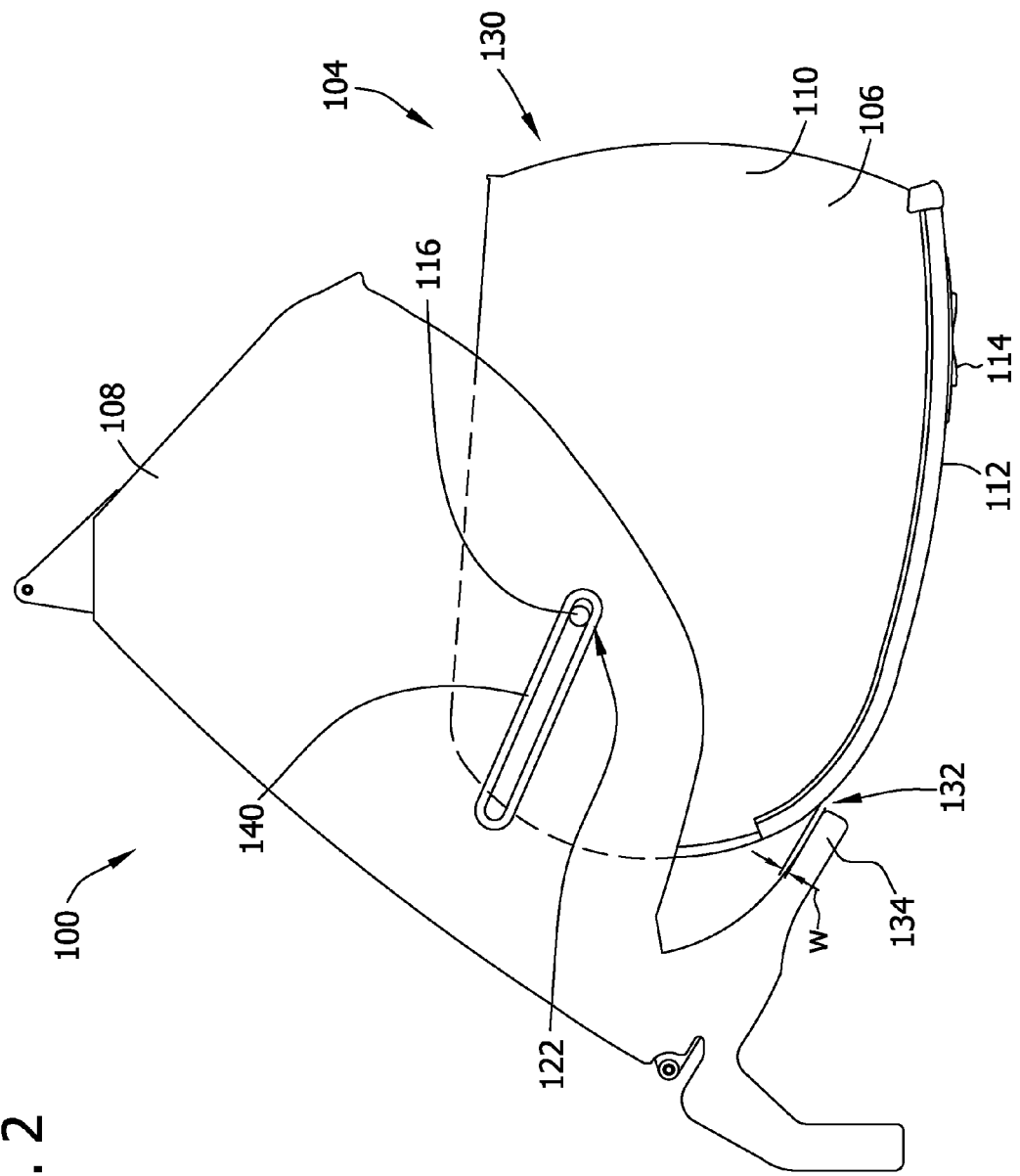
FIG. 2 is the stowage bin shown in FIG. 1 in an open position.

FIG. 1 is a side view of an exemplary stowage bin 100 in a closed position 102. FIG. 2 is a side view of stowage bin 100 in an open position 104. In the exemplary embodiment, stowage bin 100 includes a bucket 106 and a support assembly 108. Bucket 106 includes a pair of side panels 110 and a door 112 that extends between side panels 110. Door 112 includes a handle 114 that enables a user to selectively open and close stowage bin 100.

To move stowage bin 100 between closed and open positions 102 and 104, respectively, bucket 106 is rotatably coupled to support assembly 108. More specifically, each side panel 110 of bucket 106 is rotatably coupled to support assembly 108 at a pivot point 116. In open position 104, a passenger can load luggage into and/or remove luggage from stowage bin 100. When the passenger is finished loading and/or removing luggage, bucket 106 is rotated to closed position 102, such that any luggage stored therein in stowage bin 100.

As bucket 106 is opened or closed, pivot point 116 translates with respect to support assembly 108. More specifically, as bucket 106 is rotated from closed position 102 to open position 104, pivot point 116 translates from a first pivot position 120 to a second pivot position 122. Similarly, as bucket 106 is rotated from open position 104 to closed position 102, pivot point 116 translates from second pivot position 122 to first pivot position 120.

In the exemplary embodiment, first pivot position 120 is higher on support assembly 108 than second pivot position 122 with respect to, for example, an aircraft cabin floor (not shown). Accordingly, when moving from closed position 102 to open position 104, bucket 106 lowers with respect to support assembly 108. As such, an access opening 130 of stowage bin 100 is larger than if pivot point 116 did not translate with respect to support assembly 108. The larger access opening 130 enables passengers to more easily and/or more efficiently load and/or remove luggage.

Moreover, the translation of pivot point 116 shifts a center of gravity of bucket 106. Specifically, the center of gravity shifts based on lateral movement of pivot point 116. Accordingly, because of the shifted center of gravity, the force required to rotate bucket 106 from open position 104 to closed position 102 is reduced.

An interference gap 132 is defined between a lower lip 134 of support assembly 108 and door 112. In the exemplary embodiment, as bucket 106 is rotated with respect to support assembly 108, interference gap 132 is maintained at a constant width W. Because interference gap 132 is maintained at a constant width W, objects and/or passenger appendages (e.g., fingers, hands) are prevented from being pinched between bucket 106 and lip 134 as bucket 106 rotates.

In the exemplary embodiment, the translation of pivot point 116 between first pivot position 120 and second pivot position 122 is accomplished using a translating mechanism (not shown in FIGS. 1 and 2). A plurality of translating mechanisms that may be used with stowage bin 100 are described herein. In the exemplary embodiment, pivot point 116 translates between first pivot position 120 and second pivot position 122 through a track 140 defined in support assembly 108. Track 140 is an exemplary path that allows pivot point 116 to translate between first pivot position 120 and second pivot position 122. Alternatively, pivot point 116 may translate between first pivot position 120 and second pivot position 122 without the use of track 140, or with a track having a different configuration than track 140, as will become apparent from the various translating mechanisms described herein.

Figure 3:
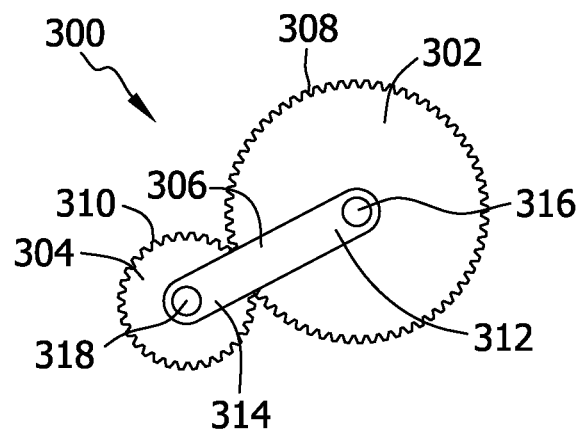
FIGS. 3-22 are exemplary translating mechanisms that may be used with the stowage bin shown in FIG. 1.

FIG. 3 is an exemplary translating mechanism 300 that may be used with stowage bin 100. Translating mechanism 300 includes a first gear 302 and a second gear 304 that are coupled together via a linkage 306. Teeth 308 extending from a first gear 302 engage teeth 310 extending from second gear 304. Linkage 306 includes a first end 312 and an opposite second end 314. First end 312 is rotatably coupled to a center 316 of first gear 302, and second end 314 is rotatably coupled to a center 318 of second gear 304.

In the exemplary embodiment, first gear 302 is securely coupled to bucket side panel 110 (shown in FIG. 1), such that when bucket 106 rotates, first gear 302 rotates. Second gear 304 is securely coupled to support assembly 108 (shown in FIG. 1). Moreover, first gear center 316 corresponds to pivot point 116 (shown in FIG. 1). As such, when bucket 106 is rotated between closed position 102 and open position 104, first gear 302 rotates about second gear 304, translating first gear center 316, and accordingly, pivot point 116, between first pivot position 120 and second pivot position 122 (both shown in FIG. 1).

Figure 4:
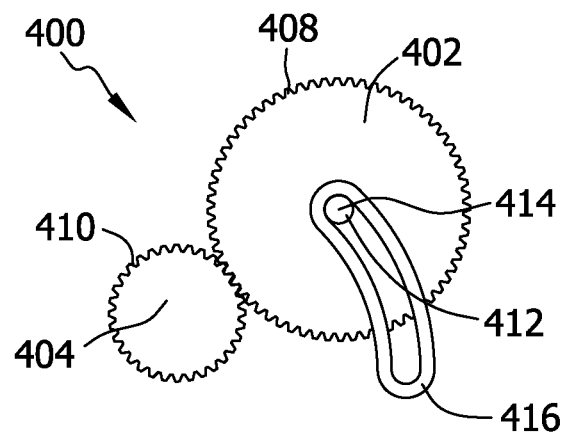

FIG. 4 is an alternative exemplary translating mechanism 400 that may be used with stowage bin 100. Translating mechanism 400 includes a first gear 402 and a second gear 404. Teeth 408 extending from first gear 402 engage teeth 410 extending from second gear 404. A pin 412, coupled to a center 414 of first gear 402, is constrained within an arcuate track 416.

In the exemplary embodiment, first gear 402 is securely coupled to bucket side panel 110 (shown in FIG. 1), such that when bucket 106 rotates, first gear 402 rotates. Second gear 404 is securely coupled to support assembly 108 (shown in FIG. 1). Moreover, first gear pin 412 corresponds to pivot point 116 (shown in FIG. 1), and track 416 is defined in support assembly 108. As such, when bucket 106 is rotated between closed position 102 and open position 104, first gear 402 rotates about second gear 404, and pin 412 is translated along track 416 in an arcuate path. Accordingly, pivot point 116 is translated between first pivot position 120 and second pivot position 122 (both shown in FIG. 1).

Figure 5:
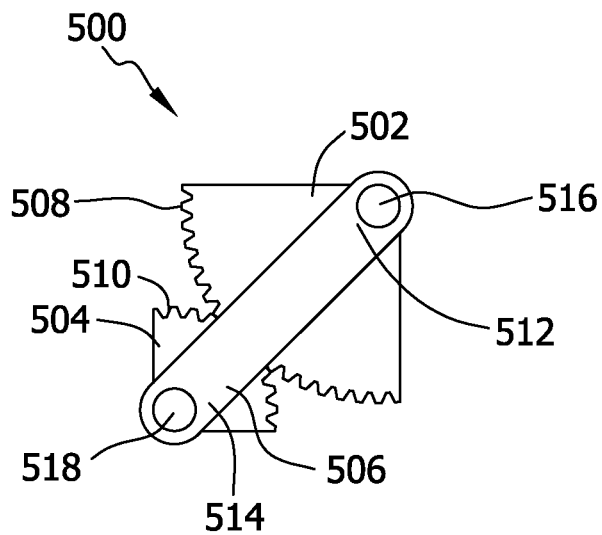

FIG. 5 is an alternative exemplary translating mechanism 500 that may be used with stowage bin 100. Translating mechanism 500 includes a first sector gear 502 and a second sector gear 504 coupled together via a linkage 506. Using sector gears 502 and 504, as opposed to full gears, in translating mechanism 500, facilitates reducing the weight and/or size of translating mechanism 500. Teeth 508 extending from first sector gear 502 engage teeth 510 extending from second sector gear 504. Linkage 506 includes a first end 512 and an opposite second end 514. First end 512 is rotatably coupled to an apex 516 of first sector gear 502, and second end 514 is rotatably coupled to an apex 518 of second sector gear 504.

In the exemplary embodiment, first sector gear 502 is securely coupled to bucket side panel 110 (shown in FIG. 1), such that when bucket 106 rotates, first sector gear 502 rotates. Second sector gear 504 is securely coupled to support assembly 108 (shown in FIG. 1). Moreover, first sector gear apex 516 corresponds to pivot point 116 (shown in FIG. 1). As such, when bucket 106 is rotated between closed position 102 and open position 104, first sector gear 502 rotates about second sector gear 504, translating first sector gear apex 516, and accordingly, pivot point 116, between first pivot position 120 and second pivot position 122 (both shown in FIG. 1).

Figure 6:
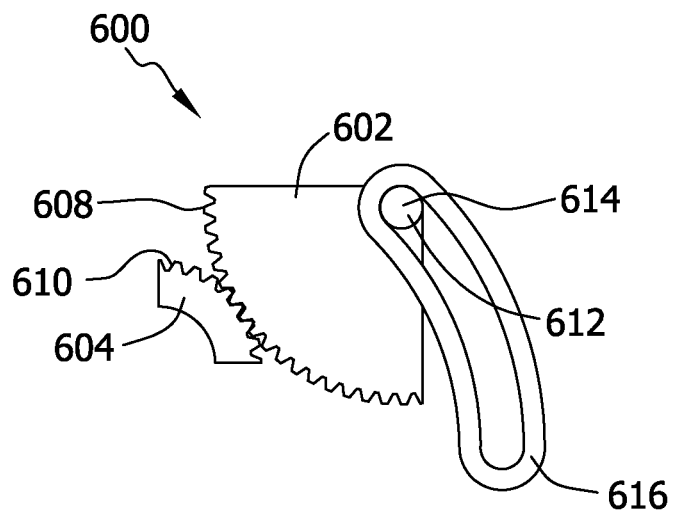

FIG. 6 is an alternative exemplary translating mechanism 600 that may be used with stowage bin 100. Translating mechanism 600 includes a sector gear 602 and an arcuate gear 604. Teeth 608 extending from sector gear 602 engage teeth 610 extending from arcuate gear 604. A pin 612 is coupled to an apex 614 of sector gear 602. Pin 612 is constrained within an arcuate track 616.

In the exemplary embodiment, sector gear 602 is fixedly coupled to side panel 110 (shown in FIG. 1) of bucket 106, such that when bucket 106 rotates, sector gear 602 rotates. Arcuate gear 604 is fixedly coupled to support assembly 108 (shown in FIG. 1). Moreover, sector gear pin 612 corresponds to pivot point 116 (shown in FIG. 1), and track 616 is defined in support assembly 108. As such, when bucket 106 is rotated between closed position 102 and open position 104, sector gear 602 rotates about arcuate gear 604, and pin 612 is translated along track 616 in an arcuate path. Accordingly, pivot point 116 is translated between first pivot position 120 and second pivot position 122 (both shown in FIG. 1).

Figure 7:
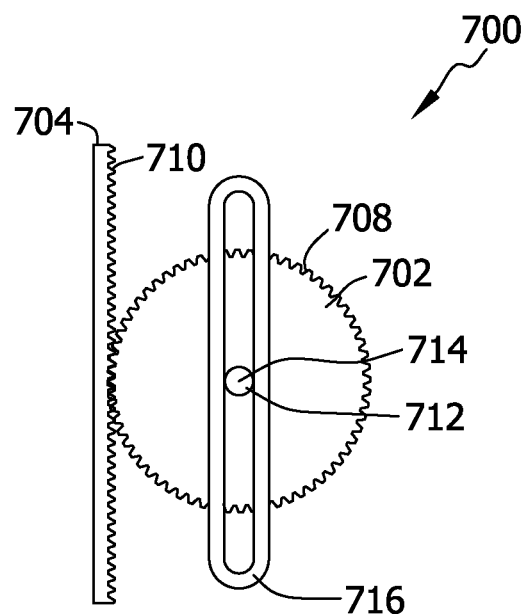

FIG. 7 is an alternative exemplary translating mechanism 700 that may be used with stowage bin 100. Translating mechanism 700 includes a gear 702 and a linear rack 704. Teeth 708 of gear 702 engage teeth 710 of rack 704. A pin 712 is coupled to a center 714 of gear 702. Pin 712 is constrained within a linear track 716, such as track 140 (shown in FIG. 1), that is substantially parallel to rack 704.

In the exemplary embodiment, gear 702 is securely coupled to bucket side panel 110 (shown in FIG. 1), such that when bucket 106 rotates, gear 702 rotates. Rack 704 is securely coupled to support assembly 108 (shown in FIG. 1). Moreover, gear pin 712 corresponds to pivot point 116 (shown in FIG. 1), and track 716 is defined in support assembly 108. As such, when bucket 106 is rotated between closed position 102 and open position 104, gear 702 crawls along rack 704, and pin 712 translates along track 716. Accordingly, pivot point 116 is translated between first pivot position 120 and second pivot position 122 (both shown in FIG. 1).

Figure 8:
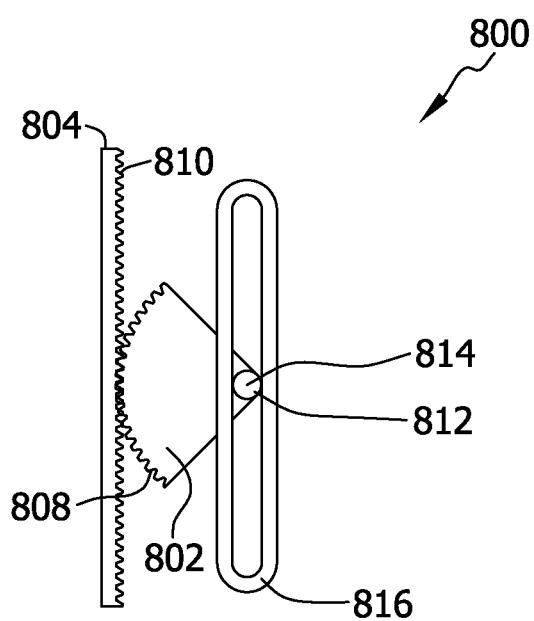

FIG. 8 is an alternative exemplary translating mechanism 800 that may be used with stowage bin 100. Translating mechanism 800 includes a sector gear 802 and a linear rack 804. Teeth 808 extending from sector gear 802 engage teeth 810 extending from rack 804. A pin 812 is coupled to an apex 814 of sector gear 802. Pin 812 is constrained withing a linear track 816, such as track 140 (shown in FIG. 1), that is substantially parallel to rack 804.

In the exemplary embodiment, sector gear 802 is securely coupled to bucket side panel 110 (shown in FIG. 1), such that when bucket 106 rotates, sector gear 802 rotates. Rack 804 is fixedly coupled to support assembly 108 (shown in FIG. 1). Moreover, sector gear pin 812 corresponds to pivot point 116 (shown in FIG. 1), and track 816 is defined in support assembly 108. As such, when bucket 106 is rotated between closed position 102 and open position 104, sector gear 802 crawls along rack 804, and pin 812 translates along track 816. Accordingly, pivot point 116 is translated between first pivot position 120 and second pivot position 122 (both shown in FIG. 1).

Figure 9:
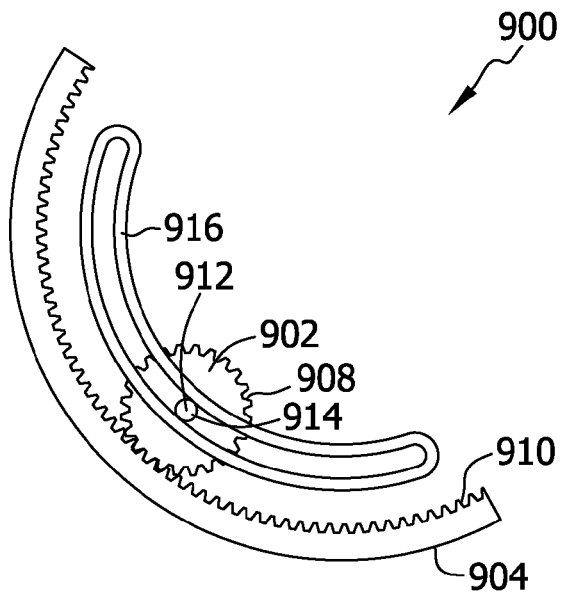

FIG. 9 is an alternative exemplary translating mechanism 900 that may be used with stowage bin 100. Translating mechanism 900 includes a gear 902 and an arcuate rack 904. Teeth 908 extending from gear 902 engage teeth 910 extending from rack 904. A pin 912 is coupled to a center 914 of gear 902. Pin 912 is constrained within an arcuate track 916 having substantially the same curvature as rack 904.

In the exemplary embodiment, gear 902 is securely coupled to side panel 110 (shown in FIG. 1) of bucket 106, such that when bucket 106 rotates, gear 902 rotates. Rack 904 is securely coupled to support assembly 108 (shown in FIG. 1). Moreover, gear pin 912 corresponds to pivot point 116 (shown in FIG. 1), and track 916 is defined in support assembly 108. As such, when bucket 106 is rotated between closed position 102 and open position 104, gear 902 crawls along rack 904, and pin 912 translates along track 916 in an arcuate path. Accordingly, pivot point 116 is translated between first pivot position 120 and second pivot position 122 (both shown in FIG. 1).

Figure 10:
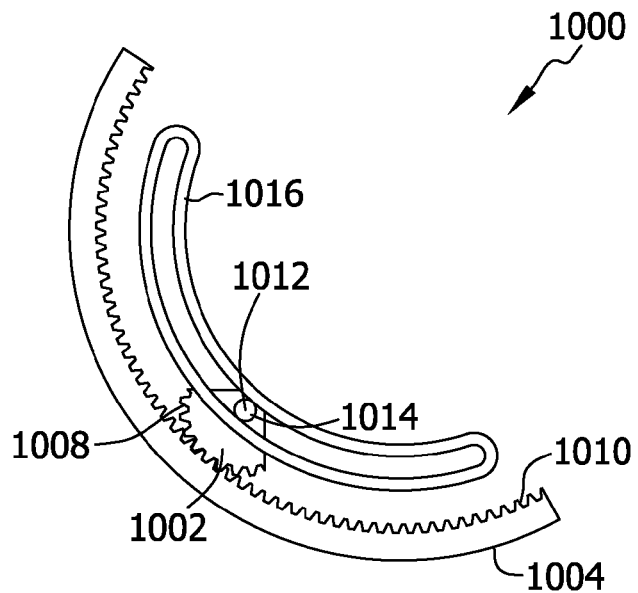

FIG. 10 is an alternative exemplary translating mechanism 1000 that may be used with stowage bin 100. Translating mechanism 1000 includes a sector gear 1002 and an arcuate rack 1004. Teeth 1008 extending from sector gear 1002 engage teeth 1010 extending from rack 1004. A pin 1012 is coupled to an apex 1014 of sector gear 1002. Pin 1012 is constrained within an arcuate track 1016 having substantially the same curvature as rack 1004.

In the exemplary embodiment, sector gear 1002 is securely coupled to side panel 110 (shown in FIG. 1) of bucket 106, such that when bucket 106 rotates, sector gear 1002 rotates. Rack 1004 is securely coupled to support assembly 108 (shown in FIG. 1). Moreover, sector gear pin 1012 corresponds to pivot point 116 (shown in FIG. 1), and track 1016 is defined in support assembly 108. As such, when bucket 106 is rotated between closed position 102 and open position 104, sector gear 1002 crawls along rack 1004, and pin 1012 translates along track 1016 in an arcuate path. Accordingly, pivot point 116 is translated between first pivot position 120 and second pivot position 122 (both shown in FIG. 1).

Figure 11:
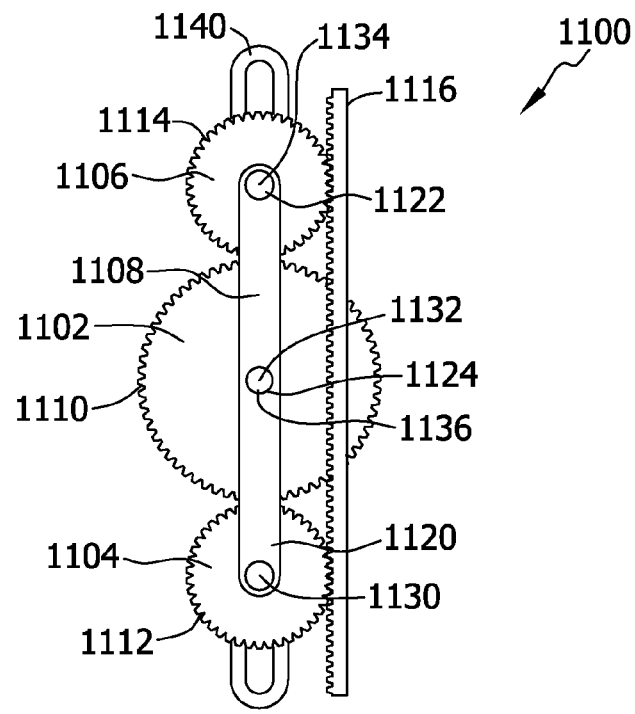

FIG. 11 is an alternative exemplary translating mechanism 1100 that may be used with stowage bin 100. Translating mechanism 1100 includes a hub gear 1102, a first planetary gear 1104, and a second planetary gear 1106 coupled together via a linkage 1108. Teeth 1110 extending from hub gear 1102 engage teeth 1112 extending from first planetary gear 1104 and teeth 1114 extending from second planetary gear 1106. First and second planetary gear teeth 1112 and 1114 also engage a linear rack 1116. In the exemplary embodiment, hub gear 1102 and first and second planetary gears 1104 and 1106 are aligned along linkage 1108.

Linkage 1108 includes a first end 1120, an opposite second end 1122, and a midpoint 1124 approximately halfway between first end 1120 and second end 1122. First end 1120 is rotatably coupled to a center 1130 of first planetary gear 1104, midpoint 1124 is rotatably coupled to a center 1132 of hub gear 1102, and second end 1122 is rotatably coupled to a center 1134 of second planetary gear 1106. In the exemplary embodiment, hub gear center 1132 includes a pin 1136 constrained within a linear track 1140, such as track 140 (shown in FIG. 1), that is substantially parallel to rack 1116. In some embodiments, first and/or second planetary gear centers 1130 and 1134 also include pins constrained within track 1140.

In the exemplary embodiment, hub gear 1102 is securely coupled to bucket side panel 110 (shown in FIG. 1), such that when bucket 106 rotates, hub gear 1102 rotates. Rack 1116 is securely coupled to support assembly 108 (shown in FIG. 1), and track 1140 is defined in support assembly 108. Moreover, hub gear pin 1136 corresponds to pivot point 116 (shown in FIG. 1). As such, when bucket 106 is rotated between closed position 102 and open position 104, rotation of hub gear 1102 causes first and second planetary gears 1104 and 1106 to rotate and crawl along rack 1116, and pin 1136 translates along track 1140. Accordingly, pivot point 116 is translated between first pivot position 120 and second pivot position 122 (both shown in FIG. 1).

Figure 12:
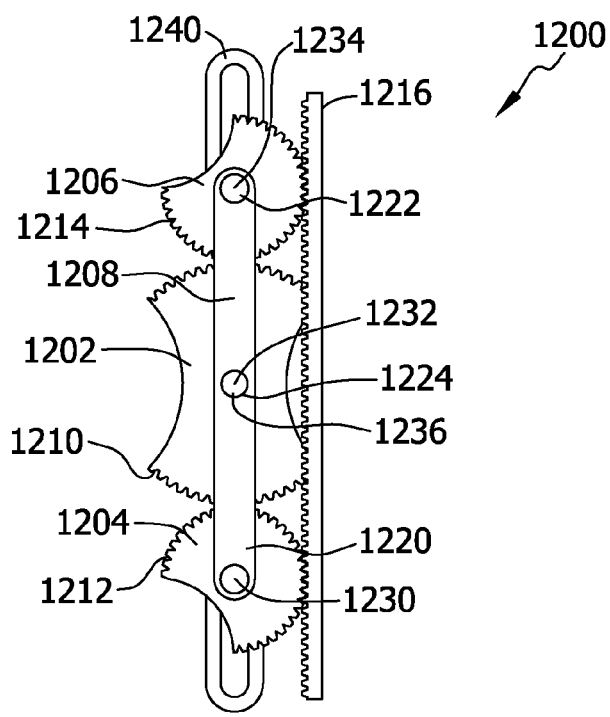

FIG. 12 is an alternative exemplary translating mechanism 1200 that may be used with stowage bin 100. Translating mechanism 1200 includes a sector hub gear 1202, a first sector planetary gear 1204, and a second sector planetary gear 1206 coupled together via a linkage 1208. Sector hub gear 1202, and first and second sector planetary gears 1204 and 1206 facilitate reducing the weight of translating mechanism 1200. Teeth 1210 extending from sector hub gear 1202 engage teeth 1212 extending from first sector planetary gear 1204 and teeth 1214 extending from second sector planetary gear 1206. First and second sector planetary gear teeth 1212 and 1214 also engage a linear rack 1216.

Linkage 1208 includes a first end 1220, an opposite second end 1222, and a midpoint 1224 approximately halfway between first end 1220 and second end 1222. First end 1220 is rotatably coupled to a center 1230 of first sector planetary gear 1204, midpoint 1224 is rotatably coupled to a center 1232 of sector hub gear 1202, and second end 1222 is rotatably coupled to a center 1234 of second sector planetary gear 1106. In the exemplary embodiment, sector hub gear center 1232 includes a pin 1236 constrained within a linear track 1240, such as track 140 (shown in FIG. 1), that is substantially parallel to rack 1216. In some embodiments, first and/or second sector planetary gear centers 1230 and 1234 also include pins constrained within track 1140.

In the exemplary embodiment, sector hub gear 1202 is securely coupled to bucket side panel 110 (shown in FIG. 1), such that when bucket 106 rotates, sector hub gear 1202 rotates. Rack 1216 is securely coupled to support assembly 108 (shown in FIG. 1), and track 1240 is defined in support assembly 108. Moreover, hub gear pin 1236 corresponds to pivot point 116 (shown in FIG. 1). As such, when bucket 106 is rotated between closed position 102 and open position 104, rotation of sector hub gear 1202 causes first and second sector planetary gears 1204 and 1206 to rotate and crawl along rack 1216, and pin 1236 translates along track 1240. Accordingly, pivot point 116 is translated between first pivot position 120 and second pivot position 122 (both shown in FIG. 1).

Figure 13:
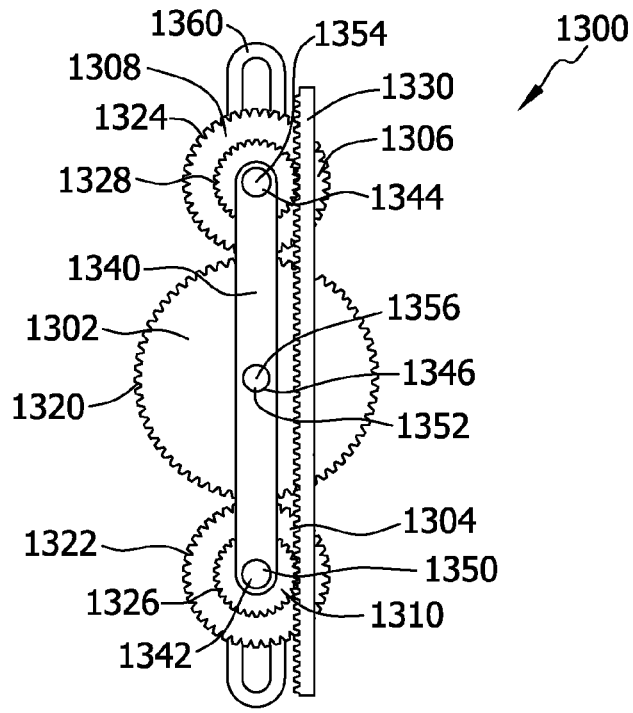

FIG. 13 is an alternative exemplary translating mechanism 1300 that may be used with stowage bin 100. Translating mechanism 1300 includes a hub gear 1302, a first planetary gear 1304, and a second planetary gear 1306. First planetary gear 1304 is securely coupled to and concentrically aligned with a first supplemental gear 1308 such that first supplemental gear 1308 rotates when first planetary gear 1304 rotates. Similarly, second planetary gear 1306 is securely coupled to and concentrically aligned with a second supplemental gear 1310 such that second supplemental gear 1310 rotates when second planetary gear 1306 rotates.

Teeth 1320 extending from hub gear 1302 engage teeth 1322 extending from first planetary gear 1304 and teeth 1324 extending from second planetary gear 1306. Teeth 1326 extending from first supplemental gear 1308 and teeth 1328 extending from second supplemental gear 1310 engage a linear rack 1330.

A linkage 1340 includes a first end 1342, an opposite second end 1344, and a midpoint 1346 approximately halfway between first end 1342 and second end 1344. First end 1342 is rotatably coupled to a center 1350 of first supplemental gear 1308, midpoint 1346 is rotatably coupled to a center 1352 of hub gear 1302, and second end 1344 is rotatably coupled to a center 1354 of second supplemental gear 1310. In the exemplary embodiment, hub gear center 1352 includes a pin 1356 constrained within a linear track 1360, such as track 140 (shown in FIG. 1), that is substantially parallel to rack 1330. In some embodiments, first and/or second planetary gears 1304 and 1306 also include pins constrained within track 1360.

In the exemplary embodiment, hub gear 1302 is fixedly coupled to bucket side panel 110 (shown in FIG. 1), such that when bucket 106 rotates, hub gear 1302 rotates. Rack 1330 is securely coupled to support assembly 108 (shown in FIG. 1), and track 1360 is defined in support assembly 108. Moreover, hub gear pin 1356 corresponds to pivot point 116 (shown in FIG. 1). As such, when bucket 106 is rotated between closed position 102 and open position 104, rotation of hub gear 1302 causes first and second planetary gears 1304 and 1306 to rotate, which in turn causes first and second supplemental gears 1308 and 1310 to rotate and crawl along rack 1330, and pin 1356 translates along track 1360. Accordingly, pivot point 116 is translated between first pivot position 120 and second pivot position 122 (both shown in FIG. 1).

Figure 14:
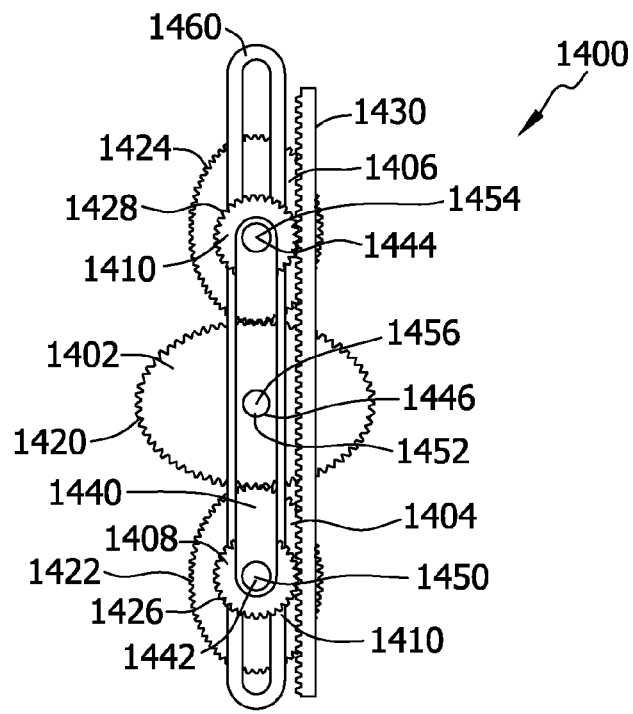

FIG. 14 is an alternative exemplary translating mechanism 1400 that may be used with stowage bin 100. Translating mechanism 1400 includes an elliptical hub gear 1402, a first elliptical planetary gear 1404, and a second elliptical planetary gear 1406. Elliptical hub gear 1402 and first and second elliptical planetary gears 1404 and 1406 may be used to generate a progressive and/or regressive input rate of mechanism 1400. First elliptical planetary gear 1404 is securely coupled to and concentrically aligned with a first supplemental gear 1408 such that first supplemental gear 1408 rotates when first elliptical planetary gear 1404 rotates. Similarly, second elliptical planetary gear 1406 is securely coupled to and concentrically aligned with a second supplemental gear 1410 such that second supplemental gear 1410 rotates when second elliptical planetary gear 1406 rotates.

Teeth 1420 extending from elliptical hub gear 1402 engage teeth 1422 extending from first elliptical planetary gear 1404 and teeth 1424 extending from second elliptical planetary gear 1406. Teeth 1426 of first supplemental gear 1408 and teeth 1428 extending from second supplemental gear 1410 engage a linear rack 1430.

A linkage 1440 includes a first end 1442, an opposite second end 1444, and a midpoint 1446 approximately halfway between first end 1442 and second end 1444. First end 1442 is rotatably coupled to a center 1450 of first supplemental gear 1408, midpoint 1446 is rotatably coupled to a center 1452 of elliptical hub gear 1402, and second end 1444 is rotatably coupled to a center 1454 of second supplemental gear 1410. In the exemplary embodiment, elliptical hub gear center 1452 includes a pin 1456 constrained within a linear track 1460, such as track 140 (shown in FIG. 1), that is substantially parallel to rack 1430. In some embodiments, first and/or second elliptical planetary gears 1404 and 1406 also include pins constrained within track 1460.

In the exemplary embodiment, elliptical hub gear 1402 is securely coupled to side panel 110 (shown in FIG. 1) of bucket 106, such that when bucket 106 rotates, elliptical hub gear 1402 rotates. Rack 1430 is securely coupled to support assembly 108 (shown in FIG. 1), and track 1460 is defined in support assembly 108. Moreover, elliptical hub gear pin 1456 corresponds to pivot point 116 (shown in FIG. 1). As such, when bucket 106 is rotated between closed position 102 and open position 104, rotation of hub gear 1402 causes first and second elliptical planetary gears 1404 and 1406 to rotate, which in turn causes first and second supplemental gears 1408 and 1410 to rotate and crawl along rack 1430, and pin 1456 translates along track 1460. Accordingly, pivot point 116 is translated between first pivot position 120 and second pivot position 122 (both shown in FIG. 1).

Figure 15:
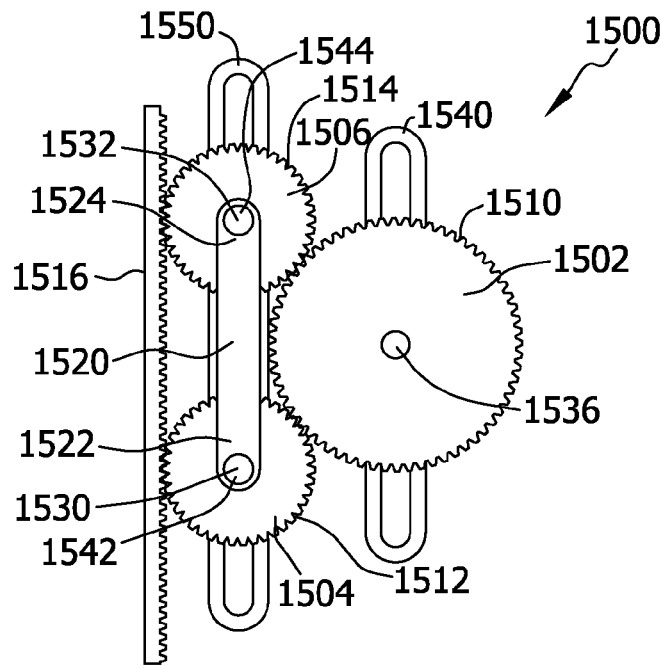

FIG. 15 is an alternative exemplary translating mechanism 1500 that may be used with stowage bin 100. Translating mechanism 1500 includes a hub gear 1502, a first planetary gear 1504, and a second planetary gear 1506. Teeth 1510 extending from hub gear 1502 engage teeth 1512 extending from first planetary gear 1504 and teeth 1514 extending from second planetary gear 1506. First and second planetary gear teeth 1512 and 1514 also engage a linear rack 1516. In the exemplary embodiment, hub gear 1502 is offset with respect to first and second planetary gears 1504 and 1506.

A linkage 1520 couples first planetary gear 1504 to second planetary gear 1506. Linkage 1520 includes a first end 1522 and an opposite second end 1524. First end 1522 is rotatably coupled to a center 1530 of first planetary gear 1504, and second end 1524 is rotatably coupled to a center 1532 of second planetary gear 1504. In the exemplary embodiment, hub gear 1502 includes a pin 1536 that is constrained within a first linear track 1540, such as track 140 (shown in FIG. 1), that is substantially parallel to rack 1516. First planetary gear center 1530 includes a pin 1542 and second planetary gear center 1532 includes a pin 1544. Pins 1542 and 1544 are constrained within a second linear track 1550 that is substantially parallel to track 1540 and rack 1516.

In the exemplary embodiment, hub gear 1502 is securely coupled to bucket side panel 110 (shown in FIG. 1), such that when bucket 106 rotates, hub gear 1502 rotates. Rack 1516 is securely coupled to support assembly 108 (shown in FIG. 1), and first and second tracks 1540 and 1550 are defined in support assembly 108. Moreover, hub gear pin 1536 corresponds to pivot point 116 (shown in FIG. 1). As such, when bucket 106 is rotated between closed position 102 and open position 104, rotation of hub gear 1502 causes first and second planetary gears 1504 and 1506 to rotate and crawl along rack 1516, and pin 1536 translates along track 1140. Accordingly, pivot point 116 is translated between first pivot position 120 and second pivot position 122 (both shown in FIG. 1).

Figure 16:
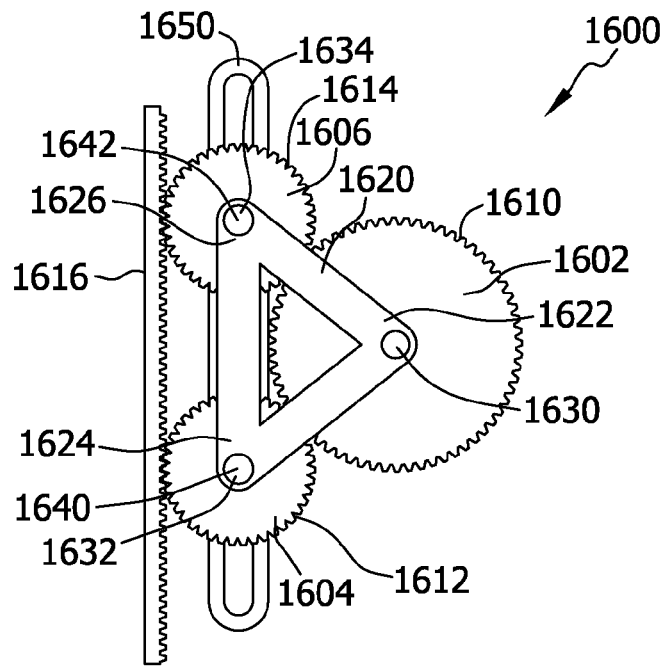

FIG. 16 is an alternative exemplary translating mechanism 1600 that may be used with stowage bin 100. Translating mechanism 1600 includes a hub gear 1602, a first planetary gear 1604, and a second planetary gear 1606. Teeth 1610 extending from hub gear 1602 engage teeth 1612 extending from first planetary gear 1604 and teeth 1614 extending from second planetary gear 1606. First and second planetary gear teeth 1612 and 1614 also engage a linear rack 1616.

A triangular linkage 1620 couples hub gear 1602, first planetary gear 1604, and second planetary gear 1606 together. Linkage 1620 includes a first apex 1622, a second apex 1624, and a third apex 1626. First apex 1622 is rotatably coupled to a center 1630 of hub gear 1602, second apex 1624 is rotatably coupled to a center 1632 of first planetary gear 1604, and third apex 1626 is rotatably coupled to a center 1634 of second planetary gear 1606. In the exemplary embodiment, first planetary gear center 1632 includes a pin 1640 and second planetary gear center 1634 includes a pin 1642. Pins 1640 and 1642 are constrained within a linear track 1650 that is substantially parallel to rack 1616.

In the exemplary embodiment, hub gear 1602 is securely coupled to bucket side panel 110 (shown in FIG. 1), such that when bucket 106 rotates, hub gear 1602 rotates. Rack 1616 is securely coupled to support assembly 108 (shown in FIG. 1), and track 1650 is defined in support assembly 108. Moreover, hub gear center 1630 corresponds to pivot point 116 (shown in FIG. 1). As such, when bucket 106 is rotated between closed position 102 and open position 104, rotation of hub gear 1602 causes first and second planetary gears 1604 and 1606 to rotate and crawl along rack 1616, and hub gear center 1630 translates. Accordingly, pivot point 116 is translated between first pivot position 120 and second pivot position 122 (both shown in FIG. 1).

Figure 17:
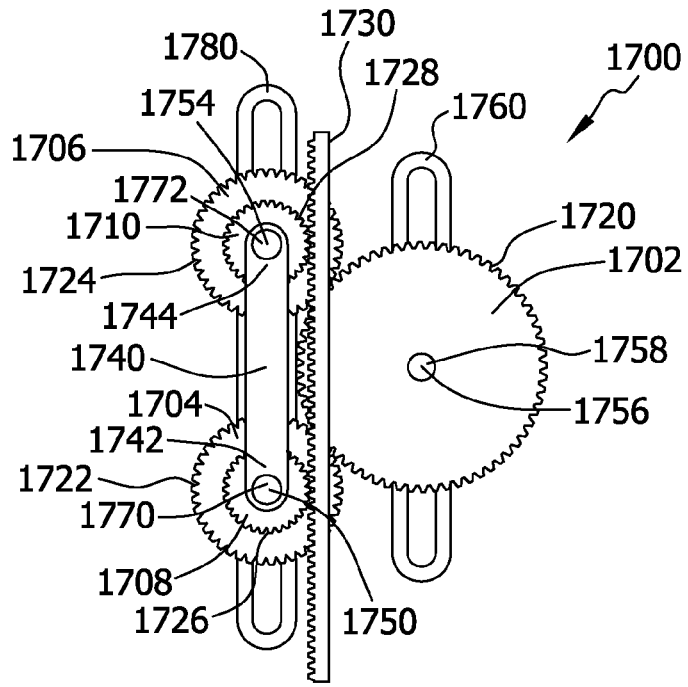

FIG. 17 is an alternative exemplary translating mechanism 1700 that may be used with stowage bin 100. Translating mechanism 1700 includes a hub gear 1702, a first planetary gear 1704, and a second planetary gear 1706. First planetary gear 1704 is securely coupled to and concentrically aligned with a first supplemental gear 1708 such that first supplemental gear 1708 rotates when first planetary gear 1704 rotates. Similarly, second planetary gear 1706 is securely coupled to and concentrically aligned with a second supplemental gear 1710 such that second supplemental gear 1710 rotates when second planetary gear 1706 rotates.

Teeth 1720 extending from hub gear 1702 engage teeth 1722 extending from first planetary gear 1704 and teeth 1724 extending from second planetary gear 1706. Teeth 1726 extending from first supplemental gear 1708 and teeth 1728 extending from second supplemental gear 1710 engage a linear rack 1730.

A linkage 1740 includes a first end 1742 and an opposite second end 1744. First end 1742 is rotatably coupled to a center 1750 of first supplemental gear 1708, and second end 1744 is rotatably coupled to a center 1754 of second supplemental gear 1710. In the exemplary embodiment, a center 1756 of hub gear 1702 includes a pin 1758 constrained within a first linear track 1760, such as track 140 (shown in FIG. 1), that is substantially parallel to rack 1730. First planetary gear 1704 includes a pin 1770 and second planetary gear 1706 includes a pin 1772. Pins 1770 and 1772 are constrained within a second linear track 1780 that is substantially parallel to rack 1730 and first track 1760.

In the exemplary embodiment, hub gear 1702 is securely coupled to bucket side panel 110 (shown in FIG. 1), such that when bucket 106 rotates, hub gear 1702 rotates. Rack 1730 is securely coupled to support assembly 108 (shown in FIG. 1), and first and second tracks 1760 and 1780 are defined in support assembly 108. Moreover, hub gear pin 1758 corresponds to pivot point 116 (shown in FIG. 1). As such, when bucket 106 is rotated between closed position 102 and open position 104, rotation of hub gear 1702 causes first and second planetary gears 1704 and 1706 to rotate, in turn causing first and second supplemental gears 1708 and 1710 to rotate and crawl along rack 1730, and pin 1758 translates along first track 1760. Accordingly, pivot point 116 is translated between first pivot position 120 and second pivot position 122 (both shown in FIG. 1).

Figure 18:
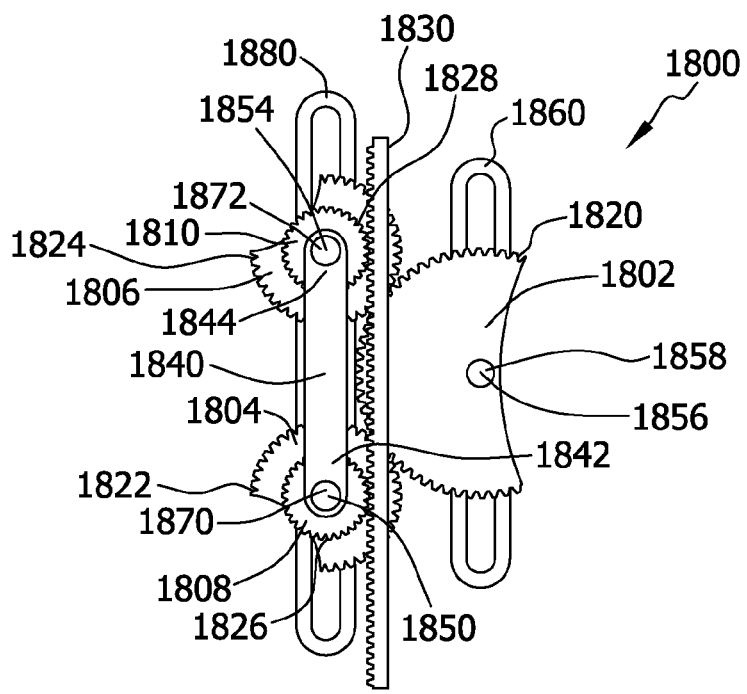

FIG. 18 is an alternative exemplary translating mechanism 1800 that may be used with stowage bin 100. Translating mechanism 1800 includes a hub sector gear 1802, a first planetary sector gear 1804, and a second planetary sector gear 1806. First planetary sector gear 1804 is securely coupled to and concentrically aligned with a first supplemental gear 1808 such that first supplemental gear 1808 rotates when first planetary sector gear 1804 rotates. Similarly, second planetary sector gear 1806 is securely coupled to and concentrically aligned with a second supplemental gear 1810 such that second supplemental gear 1810 rotates when second planetary sector gear 1806 rotates.

Teeth 1820 extending from hub sector gear 1802 engage teeth 1822 extending from first planetary sector gear 1804 and teeth 1824 extending from second planetary sector gear 1806. Teeth 1826 extending from first supplemental gear 1808 and teeth 1828 extending from second supplemental gear 1810 engage a linear rack 1830.

A linkage 1840 includes a first end 1842 and an opposite second end 1844. First end 1842 is rotatably coupled to a center 1850 of first supplemental gear 1808, and second end 1844 is rotatably coupled to a center 1854 of second supplemental gear 1810. In the exemplary embodiment, a center 1856 of hub sector gear 1802 includes a pin 1858 constrained within a first linear track 1860, such as track 140 (shown in FIG. 1), that is substantially parallel to rack 1830. First planetary sector gear 1804 includes a pin 1870 and second planetary sector gear 1806 includes a pin 1872. Pins 1870 and 1872 are constrained within a second linear track 1880 that is substantially parallel to rack 1830 and first track 1860.

In the exemplary embodiment, hub sector gear 1802 is securely coupled to bucket side panel 110 (shown in FIG. 1), such that when bucket 106 rotates, hub sector gear 1802 rotates. Rack 1830 is securely coupled to support assembly 108 (shown in FIG. 1), and first and second tracks 1860 and 1880 are defined in support assembly 108. Moreover, hub sector gear pin 1858 corresponds to pivot point 116 (shown in FIG. 1). As such, when bucket 106 is rotated between closed position 102 and open position 104, rotation of hub sector gear 1802 causes first and second planetary sector gears 1804 and 1806 to rotate, in turn causing first and second supplemental gears 1808 and 1810 to rotate and crawl along rack 1830, and pin 1858 translates along first track 1860. Accordingly, pivot point 116 is translated between first pivot position 120 and second pivot position 122 (both shown in FIG. 1).

Figure 19:
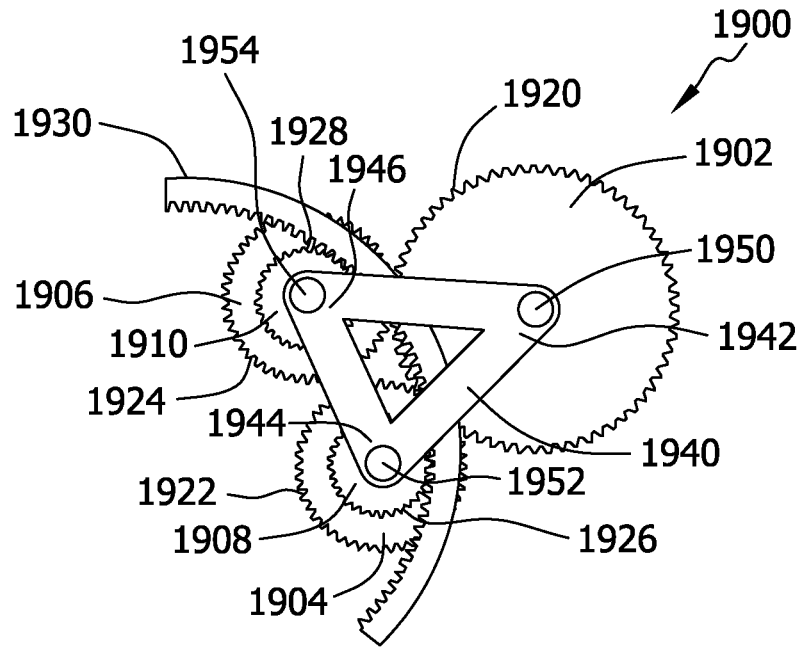

FIG. 19 is an alternative exemplary translating mechanism 1900 that may be used with stowage bin 100. Translating mechanism 1900 includes a hub gear 1902, a first planetary gear 1904, and a second planetary gear 1906. First planetary gear 1904 is securely coupled to and concentrically aligned with a first supplemental gear 1908 such that first supplemental gear 1908 rotates when first planetary gear 1904 rotates. Similarly, second planetary gear 1906 is securely coupled to and concentrically aligned with a second supplemental gear 1910 such that second supplemental gear 1910 rotates when second planetary gear 1906 rotates.

Teeth 1920 extending from hub gear 1902 engage teeth 1922 extending from first planetary gear 1904 and teeth 1924 extending from second planetary gear 1906. Teeth 1926 extending from first supplemental gear 1908 and teeth 1928 extending from second supplemental gear 1910 engage an arcuate rack 1930. A triangular linkage 1940 includes a first apex 1942, a second apex 1944, and a third apex 1946. First apex 1942 is rotatably coupled to a center 1950 of hub gear 1902, second apex 1944 is rotatable coupled to a center 1952 of first supplemental gear 1908, and third apex 1946 is rotatably coupled to a center 1954 of second supplemental gear 1910.

In the exemplary embodiment, hub gear 1902 is securely coupled to bucket side panel 110 (shown in FIG. 1), such that when bucket 106 rotates, hub gear 1902 rotates. Rack 1930 is securely coupled to support assembly 108 (shown in FIG. 1). Moreover, hub gear center 1950 corresponds to pivot point 116 (shown in FIG. 1). As such, when bucket 106 is rotated between closed position 102 and open position 104, rotation of hub gear 1902 causes first and second planetary gears 1904 and 1906 to rotate, in turn causing first and second supplemental gears 1908 and 1910 to rotate and crawl along rack 1930, and hub gear center 1950 translates. Accordingly, pivot point 116 is translated between first pivot position 120 and second pivot position 122 (both shown in FIG. 1).

Figure 20:
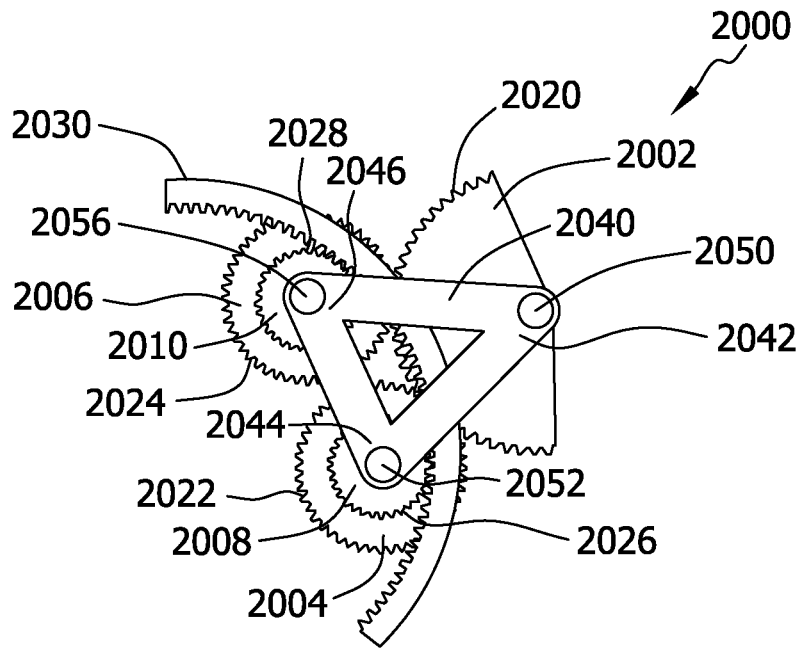

FIG. 20 is an alternative exemplary translating mechanism 2000 that may be used with stowage bin 100. Translating mechanism 2000 includes a hub sector gear 2002, a first planetary gear 2004, and a second planetary gear 2006. First planetary gear 2004 is securely coupled to and concentrically aligned with a first supplemental gear 2008 such that first supplemental gear 2008 rotates when first planetary gear 2004 rotates. Similarly, second planetary gear 2006 is securely coupled to and concentrically aligned with a second supplemental gear 2010 such that second supplemental gear 2010 rotates when second planetary gear 2006 rotates.

Teeth 2020 extending from hub sector gear 2002 engage teeth 2022 extending from first planetary gear 2004 and teeth 2024 extending from second planetary gear 2006. Teeth 2026 extending from first supplemental gear 2008 and teeth 2028 extending from second supplemental gear 2010 engage an arcuate rack 2030. A triangular linkage 2040 includes a first apex 2042, a second apex 2044, and a third apex 2046. First apex 2042 is rotatably coupled to a center 2050 of hub sector gear 2002, second apex 2044 is rotatable coupled to a center 2052 of first supplemental gear 2008, and third apex 2046 is rotatably coupled to a center 2054 of second supplemental gear 2010.

In the exemplary embodiment, hub sector gear 2002 is fixedly coupled to bucket side panel 110 (shown in FIG. 1), such that when bucket 106 rotates, hub sector gear 2002 rotates. Rack 2030 is fixedly coupled to support assembly 108 (shown in FIG. 1). Moreover, hub sector gear center 2050 corresponds to pivot point 116 (shown in FIG. 1). As such, when bucket 106 is rotated between closed position 102 and open position 104, rotation of hub sector gear 2002 causes first and second planetary gears 2004 and 2006 to rotate, in turn causing first and second supplemental gears 2008 and 2010 to rotate and crawl along rack 2030, and hub sector gear center 2050 translates. Accordingly, pivot point 116 is translated between first pivot position 120 and second pivot position 122 (both shown in FIG. 1).

Figure 21:
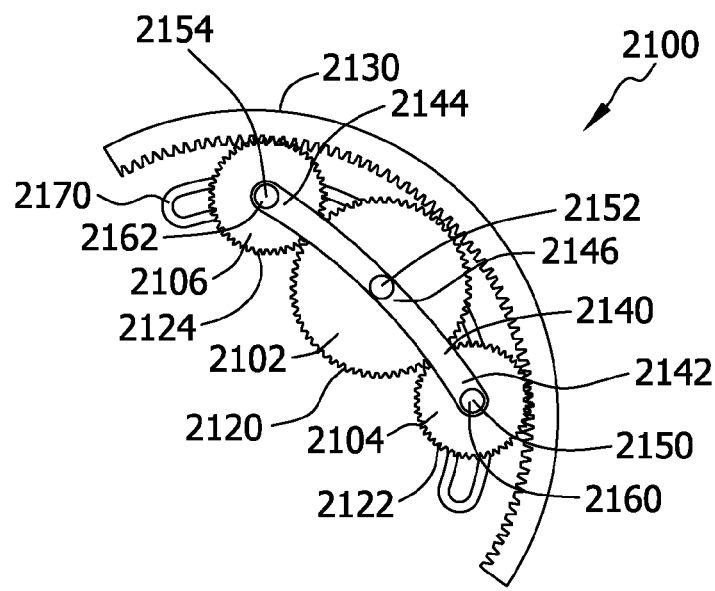

FIG. 21 is an alternative exemplary translating mechanism 2100 that may be used with stowage bin 100. Translating mechanism 2100 includes a hub gear 2102, a first planetary gear 2104, and a second planetary gear 2106. Teeth 2120 extending from hub gear 2102 engage teeth 2122 extending from first planetary gear 2104 and teeth 2124 extending from second planetary gear 2106. First and second planetary gear teeth 2122 and 2124 engage an arcuate rack 2130.

An arcuate linkage 2140 includes a first end 2142, a second end 2144, and a midpoint 2146 approximately halfway between first end 2142 and second end 2144. First end 2142 is rotatably coupled to a center 2150 of first planetary gear 2104, midpoint 2146 is rotatably coupled to a center 2152 of hub gear 2102, and second end 2144 is rotatably coupled to a center 2154 of second planetary gear 2106. In the exemplary embodiment, first planetary gear center 2150 includes a pin 2160 and second planetary gear center 2154 includes a pin 2162. Pins 2160 and 2162 are constrained within an arcuate track 2170 that has substantially the same curvature of rack 2130.

In the exemplary embodiment, hub gear 2102 is securely coupled to bucket side panel 110 (shown in FIG. 1), such that when bucket 106 rotates, hub gear 2102 rotates. Rack 2130 and track 2170 are securely coupled to support assembly 108 (shown in FIG. 1). Moreover, hub gear center 2152 corresponds to pivot point 116 (shown in FIG. 1). As such, when bucket 106 is rotated between closed position 102 and open position 104, rotation of hub gear 2102 causes first and second planetary gears 2104 and 2106 to rotate and crawl along rack 2130, and hub gear center 2152 translates. Accordingly, pivot point 116 is translated between first pivot position 120 and second pivot position 122 (both shown in FIG. 1).

Figure 22:
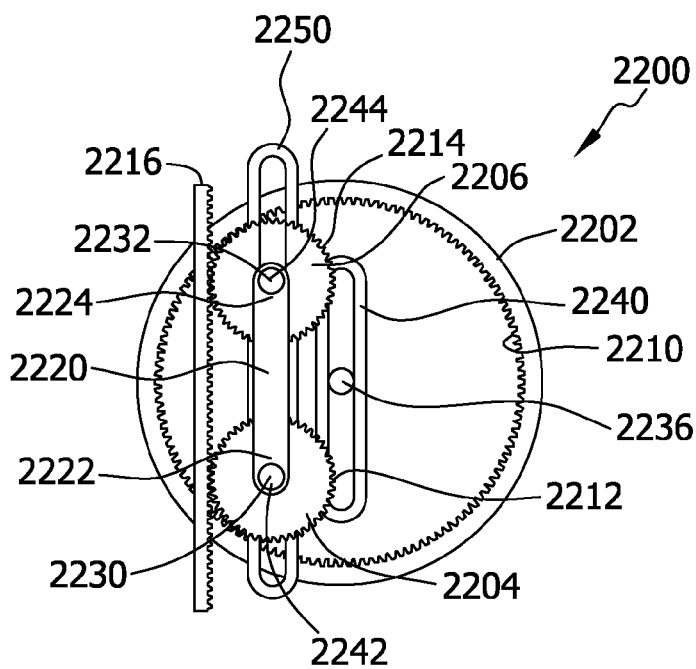

FIG. 22 is an alternative exemplary translating mechanism 2200 that may be used with stowage bin 100. Translating mechanism 2200 includes a ring gear 2202, a first gear 2204, and a second gear 2206. Inner teeth 2210 extending from ring gear 2202 engage teeth 2212 extending from first gear 2204 and teeth 2214 extending from second gear 2206. First and second gear teeth 2212 and 2214 also engage a linear rack 2216.

A linkage 2220 couples first gear 2204 to second gear 2206. Linkage 2220 includes a first end 2222 and an opposite second end 2224. First end 2222 is rotatably coupled to a center 2230 of first gear 2204, and second end 2224 is rotatably coupled to a center 2232 of second gear 2204. In the exemplary embodiment, ring gear 2202 includes a central pin 2236 coupled to ring gear 2202 using one or more members (not shown). Ring gear central pin 2236 is constrained within a first linear track 2240, such as track 140 (shown in FIG. 1), that is substantially parallel to rack 2216. First gear center 2230 includes a pin 2242 and second planetary gear center 2232 includes a pin 2244. Pins 2242 and 2244 are constrained within a second linear track 2250 that is substantially parallel to track 2240 and rack 2216.

In the exemplary embodiment, hub gear 1502 is securely coupled to bucket side panel 110 (shown in FIG. 1), such that when bucket 106 rotates, ring gear 2202 rotates. Rack 2216 is securely coupled to support assembly 108 (shown in FIG. 1), and first and second tracks 2240 and 2250 are defined in support assembly 108. Moreover, ring gear pin 2236 corresponds to pivot point 116 (shown in FIG. 1). As such, when bucket 106 is rotated between closed position 102 and open position 104, rotation of ring gear 2202 causes first and second gears 2204 and 2206 to rotate and crawl along rack 2216, and pin 2236 translates along track 2240. Accordingly, pivot point 116 is translated between first pivot position 120 and second pivot position 122 (both shown in FIG. 1).

In each embodiment, the translating mechanisms include pivot point 116. While the embodiments described herein specify a location of pivot point 116 (shown in FIG. 1) on the various translating mechanisms, the location of pivot point 116 is not limited to the specific locations described herein. Furthermore, as will be apparent to those skilled in the art, the translating of pivot point 116 may be accomplished using a variety of translating mechanisms, not limited to the embodiments described herein. Further the exemplary translating mechanisms described herein have application beyond stowage bins, and may be implemented in a variety of systems and apparatuses.

The embodiments described herein provide improvements over at least some known stowage bins. As compared to at least some known stowage bins, the stowage bins described herein have a wider access opening in an open position, as compared to known stowage bins. As a result, the embodiments described herein provide increased access to passengers. Moreover, as compared to at least some known stowage bins, the stowage bins described herein require less force to close, as the center of gravity of the bucket shifts due to the translation of the pivot point. Furthermore, the stowage bins described herein maintain a constant interference gap between the bucket and the support assembly during rotation to prevent pinching objects between the bucket and support assembly.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stowage bin comprising:
   a support assembly;
   a bucket comprising a first side panel, a second side panel, a door extending between said first and second side panels, and a pivot point, said bucket rotatable about said pivot point between a closed position and an open position, wherein a width of an interference gap defined between said door and a lip of said support assembly is maintained at a substantially constant width as said bucket is rotated between the closed and open positions; and
   a translating mechanism coupling said bucket to said support assembly such that when said bucket is rotated between the closed and open positions, said pivot point translates along a linear path with respect to said support assembly between a first pivot position and a second pivot position.

2. A stowage bin in accordance with claim 1, wherein said translating mechanism comprises a track defined in said support assembly, said pivot point configured to translate between the first and second pivot positions within said track.

3. A stowage bin in accordance with claim 1, wherein said translating mechanism further comprises a gear securely coupled to said bucket, a center of said gear corresponds to said pivot point.

4. A stowage bin in accordance with claim 3, wherein said translating mechanism further comprises a track defined in said support assembly, said gear comprises a pin at said gear center that is constrained within said track.

5. A stowage bin in accordance with claim 3, wherein said translating mechanism further comprises a plurality of planetary gears that engage said gear.

6. A stowage bin in accordance with claim 5, wherein said translating mechanism further comprises a rack coupled to said support assembly, said plurality of planetary gears engage said rack and are moveable relative to said rack to translate said pivot point between the first and second pivot positions.

7. A stowage bin in accordance with claim 1, wherein said translating mechanism comprises:
   a first gear fixedly coupled to said bucket;
   a second gear coupled to said first gear; and
   a linkage rotatably coupled to a center of said first gear and to a center of said second gear.

8. An apparatus comprising:
   a first object;
   a second object comprising a first side panel, a second side panel, a door extending between said first and second side panels, and a pivot point, said second object rotatable about said pivot point between a first position and a second position, wherein a width of an interference gap defined between said door and a lip of said first object is maintained at a substantially constant width as said second object is rotated between the first and second positions; and
   a translating mechanism coupling said second object to said first object such that when said second object is rotated between the first and second positions, said pivot point translates along a linear path with respect to said first object between a first pivot position and a second pivot position.

9. An assembly in accordance with claim 8, wherein said translating mechanism comprises a track defined in said first object, said pivot point configured to translate between the first and second pivot positions within said track.

10. An assembly in accordance with claim 8, wherein said translating mechanism further comprises a gear securely coupled to said second object, a center of said gear corresponding to said pivot point.

11. An assembly in accordance with claim 10, wherein said translating mechanism further comprises a plurality of planetary gears that engage said gear.

12. An assembly in accordance with claim 8, wherein said translating mechanism comprises:
    a first gear securely coupled to said second object;
    a second gear coupled to said first gear; and
    a linkage rotatably coupled to a center of said first gear and a center of said second gear.

13. A method of assembling a stowage bin, said method comprising:
    providing a bucket including a first side panel, a second side panel, a door extending between the first and second side panels, and a pivot point, wherein the bucket is selectively rotatable about the pivot point between a closed position and an open position; and
    coupling the bucket to a support assembly via a translating mechanism such that when the bucket is rotated between the closed and open positions, the pivot point translates along a linear path with respect to the support assembly between a first pivot position and a second pivot position, and a width of an interference gap defined between the door and a lip of the support assembly is maintained at a substantially constant width.

14. A method in accordance with claim 13, wherein coupling the bucket to a support assembly via a translating mechanism comprises coupling the bucket to the support assembly via a translating mechanism that includes a track defined in the support assembly, the pivot point configured to translate between the first and second pivot positions within the track.

15. A method in accordance with claim 13, wherein coupling the bucket to a support assembly via a translating mechanism comprises coupling the bucket to the support assembly via a translating mechanism that includes a gear securely coupled to the bucket, a center of the gear corresponding to the pivot point.

16. A method in accordance with claim 13, wherein coupling the bucket to a support assembly via a translating mechanism comprises coupling the bucket to the support assembly via a translating mechanism that includes a first gear securely coupled to the bucket, a second gear engaging the first gear, and a linkage rotatably coupled to a center of the first gear and a center of the second gear.

17. A stowage bin comprising:
    a support assembly;
    a bucket comprising a pivot point, said bucket rotatable about said pivot point between a closed position and an open position; and
    a translating mechanism comprising a gear securely coupled to said bucket, and at least one planetary gear that engages said gear, said translating mechanism coupling said bucket to said support assembly such that when said bucket is rotated between the closed and open positions, said pivot point translates along a linear path with respect to said support assembly between a first pivot position and a second pivot position.

18. A method of assembling a stowage bin, said method comprising:

providing a bucket including a pivot point, wherein the bucket is selectively rotatable about the pivot point between a closed position and an open position; and coupling the bucket to a support assembly via a translating mechanism that includes a gear securely coupled to the bucket, and at least one planetary gear that engages the gear, such that when the bucket is rotated between the closed and open positions, the pivot point translates along a linear path with respect to the support assembly between a first pivot position and a second pivot position.

* * * * *